(12) United States Patent
Omar

(10) Patent No.: US 9,197,432 B2
(45) Date of Patent: *Nov. 24, 2015

(54) ADAPTIVE TEST SYSTEM FOR NETWORK FUNCTION AND PERFORMANCE EVALUATION

(75) Inventor: Hassan M. Omar, Mt. Vernon, NY (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 493 days.

This patent is subject to a terminal disclaimer.

(21) Appl. No.: 13/448,463

(22) Filed: Apr. 17, 2012

(65) Prior Publication Data

US 2012/0203492 A1    Aug. 9, 2012

Related U.S. Application Data

(62) Division of application No. 12/144,858, filed on Jun. 24, 2008, now Pat. No. 8,174,996.

(51) Int. Cl.
  *H04J 1/16* (2006.01)
  *H04L 12/26* (2006.01)

(52) U.S. Cl.
  CPC ............ *H04L 12/2697* (2013.01); *H04L 43/50* (2013.01)

(58) Field of Classification Search
  CPC ............ H04J 1/16; G08C 15/00; G06F 19/00

USPC .............. 370/241–253; 714/724, 51, 738, 38; 702/119, 122, 123, 188, 108

See application file for complete search history.

(56) References Cited

U.S. PATENT DOCUMENTS

| | | | |
|---|---|---|---|
| 5,943,640 A | 8/1999 | Macpherson | |
| 6,167,352 A * | 12/2000 | Kanevsky et al. | 702/81 |
| 7,032,133 B1 * | 4/2006 | Lang et al. | 714/33 |
| 7,082,463 B1 | 7/2006 | Bradley et al. | |
| 7,408,380 B1 | 8/2008 | Hassoun et al. | |
| 7,484,142 B2 | 1/2009 | Crump et al. | |
| 2005/0203717 A1 * | 9/2005 | Parimi | 702/188 |

\* cited by examiner

*Primary Examiner* — Jamal Javaid

(57) ABSTRACT

A method may include receiving a first set of parameters associated with a test environment, the test environment including a test system for testing a network, receiving a test objective, conducting a first test case based on the received first set of parameters and the test objective, automatically determining, by the test system, whether the test objective has been satisfied based on a first test result associated with the first test case, and automatically adapting, by the test system, a second test case based on the first test result when it is determined that the test objective has not been satisfied.

20 Claims, 9 Drawing Sheets

ADAPTIVE TEST SYSTEM FOR NETWORK FUNCTION AND PERFORMANCE EVALUATION

RELATED APPLICATION

The present application is a divisional of U.S. patent application Ser. No. 12/144,858, filed Jun. 24, 2008, the disclosure of which is hereby incorporated by reference herein.

BACKGROUND

A network may utilize multiple technologies and network components to support an amalgamation of services (e.g., voice, video, data, etc.). Before deploying such services, lab evaluations of a test environment may be conducted to ensure that the network, with all its corresponding components, is in compliance with the intended design requirements. In other instances, a test environment may be utilized to emulate different scenarios that may be occurring in the field. For example, a network may be experiencing power failures, switchover failures, and/or other performance issues. In such instances, a test team may emulate and evaluate numerous scenarios related to the existing problem so as to discover the source of the problem and offer solutions to correct it.

A typical test environment may include a test system and a network to be tested (sometimes referred to as a "test bed"). The network may include one or multiple network components, and the test system may include one or multiple test components. The test systems utilized for emulating and analyzing various scenarios can be very complex since they must interface with various network components, platforms, protocols, etc.

Existing test systems typically focus on a specific test area. For example, packet generators and analyzers may focus on generating packets at one point in the network, and then intercepting the traffic at another point in the network. However, extending the scope of testing beyond a particular criterion typically requires some type of intervention. For example, to evaluate packet loss due to a physical link failure event within the customer premises, a tester will need to initialize the packet generator and then manually introduce the link failure and collect the corresponding results. When emulating even more complex scenarios that involve multiple failures, the tester's intervention may be more prevalent, which can greatly slow down the testing process and/or cause inaccurate results. Additionally, depending on the test case, other issues may arise. For example, when a tester is verifying the effects of a power recovery sequence that involves different network components, the tester may have to emulate numerous scenarios to adequately explore this test case. For example, a power recovery sequence may require multiple runs because of the different timing parameters that need to be tested. When considering the large number of network components that can exist in such a test case, in addition to the variations of software, hardware, and/or firmware (e.g., different models, versions, etc.) that may be included with the network components, the number of emulations needed for adequately covering this test case increases exponentially.

DETAILED DESCRIPTION OF PREFERRED EMBODIMENTS

The following detailed description refers to the accompanying drawings. The same reference numbers in different drawings may identify the same or similar elements. Also, the following description does not limit the invention.

Figure 1:
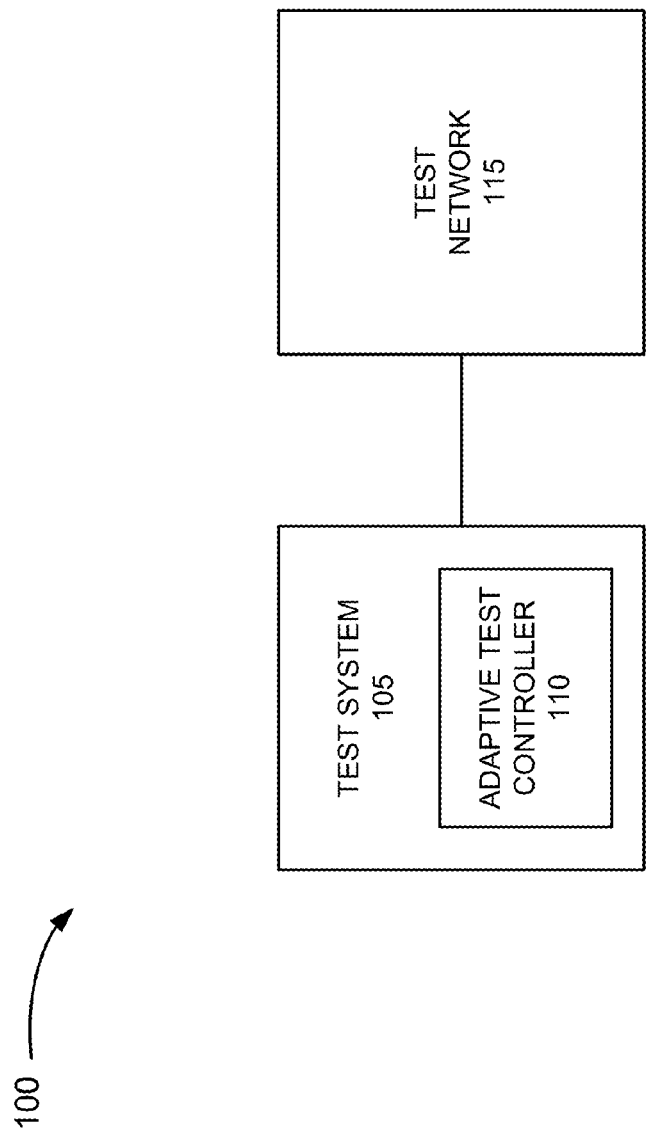
FIG. 1 is a diagram illustrating concepts described herein.

The concepts described herein may provide a test system that supports adaptive test path selection. The test system may automatically select an adapted test path based on results generated from a previously conducted test case or test cases. For example, the test system may automatically reconfigure parameters and/or test multiple scenarios in accordance with the adapted test path. FIG. 1 is a diagram illustrating an exemplary environment 100 in which the concepts may be implemented. As illustrated, environment 100 may include a test system 105 that includes an adaptive test controller (ATC) 110, and a test network 115.

Test system 105 may include test components. A component, as the term is used herein, may include, for example, hardware, software and hardware, and/or firmware. Accordingly, a component may correspond to a device, an application, an entity, etc. Test system 105 may include various test components that perform various functions in order to appropriately conduct tests on test network 115. For example, test components may include traffic generators, analyzers, power control modules, connection control modules, and/or other types of test components that permit a tester to conduct a test on test network 115.

Test system 105 may also include a test component, ATC 110. ATC 110 may, among other things, automatically select and/or modify (i.e., adapt) a test path based on earlier conducted tests and/or previously learned and/or available information. Test path selection, as the term is used herein, may include, for example, the selection of one or multiple test cases (sometimes referred to as test scenarios) and their relationship with respect to a test objective, a test criterion, etc. For example, ATC 110 may adapt the test path by selecting test cases that have a certain level of probability (e.g. more likely than not) to yield additional information that is not already known and/or further the testing process towards, for example, identifying a source of problem being tested and/or resolving a test objective. Additionally, or alternatively, adapting the test path selection may encompass modifying the scope of the test objective, test criterion, etc. For example, a test objective may involve the testing of multiple variables that have a relationship with a problem being tested. In such an instance, ATC 110 may select test cases that relate to a first variable associated with the problem. Upon a determination that the first variable has been sufficiently tested, ATC 110 may modify the scope of the test to a second variable and/or a combination of the first variable and the second variable. ATC 110 may select test cases based on, for example, the scope of the test objective and/or test criteria.

It will be appreciated that a test case may include and/or relate to various types of data. For example, a test case may include and/or relate to, for example, a particular problem to be solved (e.g., delay, power failure, etc.), a particular network element or configuration of network elements of test network 115, a particular sequence of network events, a particular network state, etc. In this regard, when selecting a test case, ATC 110 may determine numerous parameters. For example, as will be described in greater detail below, a test case may involve, for example, scheduling the test, setting up the test, conducting the test, analyzing the results of the test, determining whether the problem has been identified, determining whether additional test cases need to be selected and/or conducted, and/or other types of evaluations that lead to a solution of the problem and/or a resolution of the testing process.

Test network 115 may include one or multiple network components. For example, a network component may include a device of a subscriber (e.g., customer premises equipment), a device of a service provider (e.g., a server), or a device of an operator (e.g., a router).

In an exemplary operation, test system 105 may conduct tests on test network 115. During the testing process, ATC 110 may select and/or adapt the test path based on earlier conducted tests and/or previously learned and/or available information.

As a result of the foregoing, test system 105 may, among other things, yield more accurate results. For example, test system 105 may automatically reconfigure parameters associated with a test case, thus, eliminating manual intervention and possible mistakes occurring during the testing process. Additionally, or alternatively, test system 105 may reduce the testing time. For example, ATC 110 may adapt testing parameters, configuration data, and/or the test environment so that the number of the test cases may be reduced and the overall testing time may be reduced. Since concepts have been broadly described in relation to test system 105, variations to the above concepts will be discussed further below.

Figure 2:
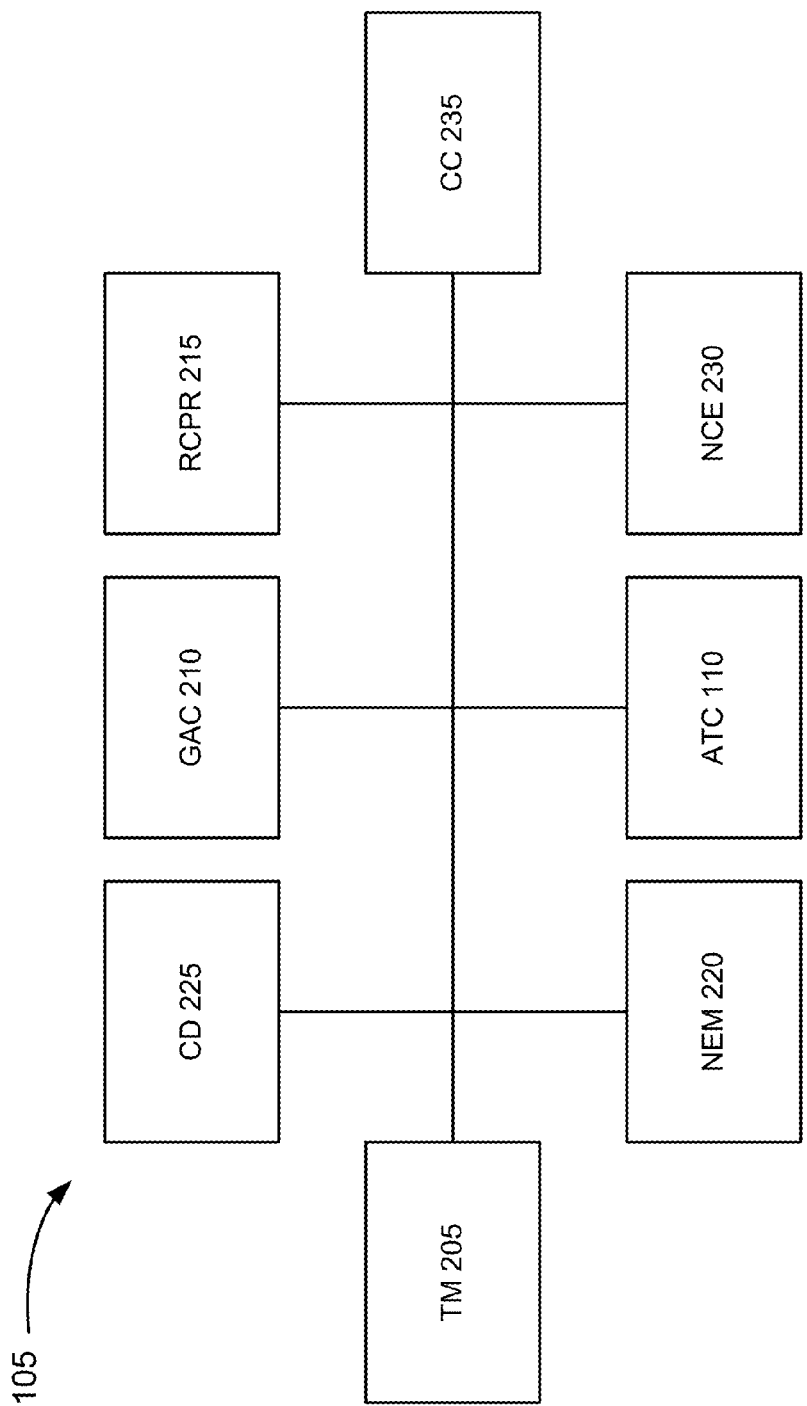
FIG. 2 is a diagram illustrating exemplary test components of the test system depicted in FIG. 1.

FIG. 2 is a diagram of exemplary test components of test system 105. As illustrated, test system 105 may include a test manager (TM) 205, a generator and analyzer complex (GAC) 210, a remote control power regulator (RCPR) 215, a network element manager (NEM) 220, a configuration database (CD) 225, a network condition emulator (NCE) 230, and a connection controller (CC) 235. ATC 110 was previously described above in connection with FIG. 1.

TM 205 may be communicatively coupled to one or more of the other test components (e.g., GAC 210, RCPR 215, etc.) of test system 200. In this way, various aspects of the testing process may be adapted in correspondence to the adaptations determined by ATC 110.

GAC 210 may generate different types of traffic (e.g., voice, data, multimedia, etc.) in correspondence to different types of network services (e.g., Internet, television, etc.) and/or platforms (e.g., protocols, etc.). GAC 210 may analyze network performance based on a variety of performance metrics (e.g., throughput, delay, quality of service (QoS) metrics, etc.), as well as the structure of a packet. The term "packet," as used herein, is intended to be broadly interpreted to include a datagram, a frame, a cell, or any other type of delivery unit or mechanism.

RCPR 215 may automatically regulate power supplied to network components in the test bed. For example, RCPR 215 may supply power or deny power to a network component. RCPR 215 may supply alternating current (AC) and/or direct current (DC). RCPR 215 may be remotely controlled by TM 205 to manage power events (e.g., emulating a power outage event, a power recovery event, etc.).

NEM 220 may automatically access and manage network components in the test bed. NEM 220 may configure a network component with an appropriate configuration and/or collect information from the network component. For example, the collected information may be utilized for interpreting the operation of the network component and/or the test results. Typically, a network component maybe accessed through two interfaces. The first interface may provide for a remote access session (e.g., Telnet, Secure Shell (SSH), Remote Desktop Protocol (RDP), and Hypertext Transfer Protocol (HTTP)). For example, the first interface may include an Ethernet interface. The second interface may include a console interface (e.g., a serial connection). The second interface may provide access to a network component when access through the first interface may not be available due to specific events (e.g., during system initialization when layer 3 service is not available). A terminal server element may be used to facilitate console port access. NEM 220 may support a variety of access schemes.

CD 225 may include a repository of configurations files. For example, the configuration files may be used to setup and implement different test cases with respect to different network components in the test bed. CD 225 may include configuration scripts that may be used to implement specific functions on a network component, a test tool, and/or another element in the test bed. CD 225 may include objects with hard coded values and/or objects with configurable values. TM 205 may identify the appropriate the objects and/or parameters during the testing process. ATC 110 may modify configurable parameters associated with the objects based on results obtained from test cases implemented earlier. Examples of configuration objects may include a configuration object to connect two ports via CC 235, a configuration object to generate bidirectional traffic between two points, or a configuration object to describe a traffic generator profile.

NCE 230 may emulate network conditions. For example, NCE 230 may emulate delay, packet loss, jitter, etc., in varying degrees based on configuration settings.

CC 235 may automatically interconnect network components in the test bed. For example, CC 235 may include a remote control patch-panel switching module. CC 235 may support various types of media (e.g., optical, copper, etc.). In another implementation CC 235 may employ layer 2 technologies. For example, CC 235 may include an Ethernet switch, an Asynchronous Transfer Mode (ATM) switch, a Frame Relay switch, an Integrated Services Digital Network (ISDN) switch, etc. CC 235 may be remotely controlled by TM 205 for synchronizing interconnectivity events and test implementation procedures.

A test component of test system 105 may be of any technological platform, standard, version, etc. For example, the test component may operate according to a specific protocol, network type (e.g., cooper, fiber optic, etc.), interface, operating system and/or version, etc.

Although FIG. 2 illustrates exemplary test components of test system 105, in other implementations, test system 105 may include additional, fewer, or different test components. The connections between the test components are exemplary.

Figure 3:
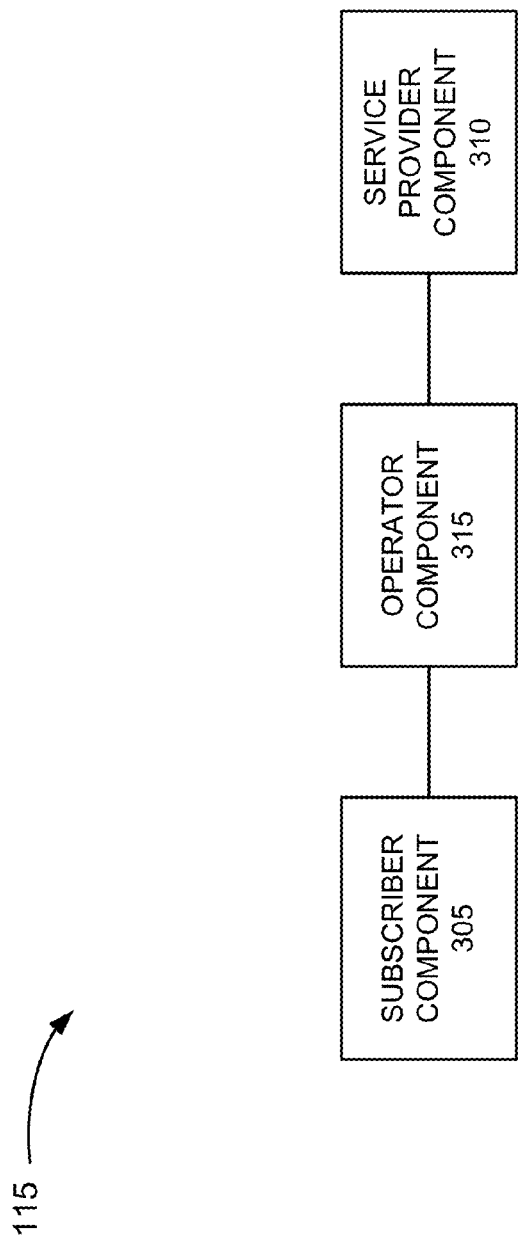
FIG. 3 is a diagram illustrating exemplary network components of the test network depicted in FIG. 1.

FIG. 3 is a diagram illustrating exemplary network components of test network 115. As illustrated, test network 115 may include a subscriber component 305, a service provider component 310, and/or an operator component 315.

Subscriber component 305 may include, for example, a personal computer (PC), a router, a modem, a television, a telephone, a software application, and/or some other type of network component.

Service provider component 310 may include, for example, a bridge, a router, a server, an application, and/or some other type of network component.

Operator component 315 may include, for example, a transport system, a bridge, a router, a switch, an application and/or some other type of network component.

A network component of test network 115 may be of any technological platform, standard, version, etc. For example, the network component may operate according to a specific protocol, network type (e.g., cooper, fiber optic, etc.), interface, operating system and/or version, etc. Test network 115 may include multiple network components of the same general type (e.g., a router), but the multiple network components may correspond to different models, versions, etc., having different capabilities, etc. Test network 115 may include network components that provide various services. Test network 115 may be configured to operate according to any number of performance metrics (e.g., throughput, bandwidth), etc.

Although FIG. 3 illustrates exemplary network components of test network 115, in other implementations, test network 115 may include additional, fewer, or different network components. The connections between the network components are exemplary.

Figure 4:
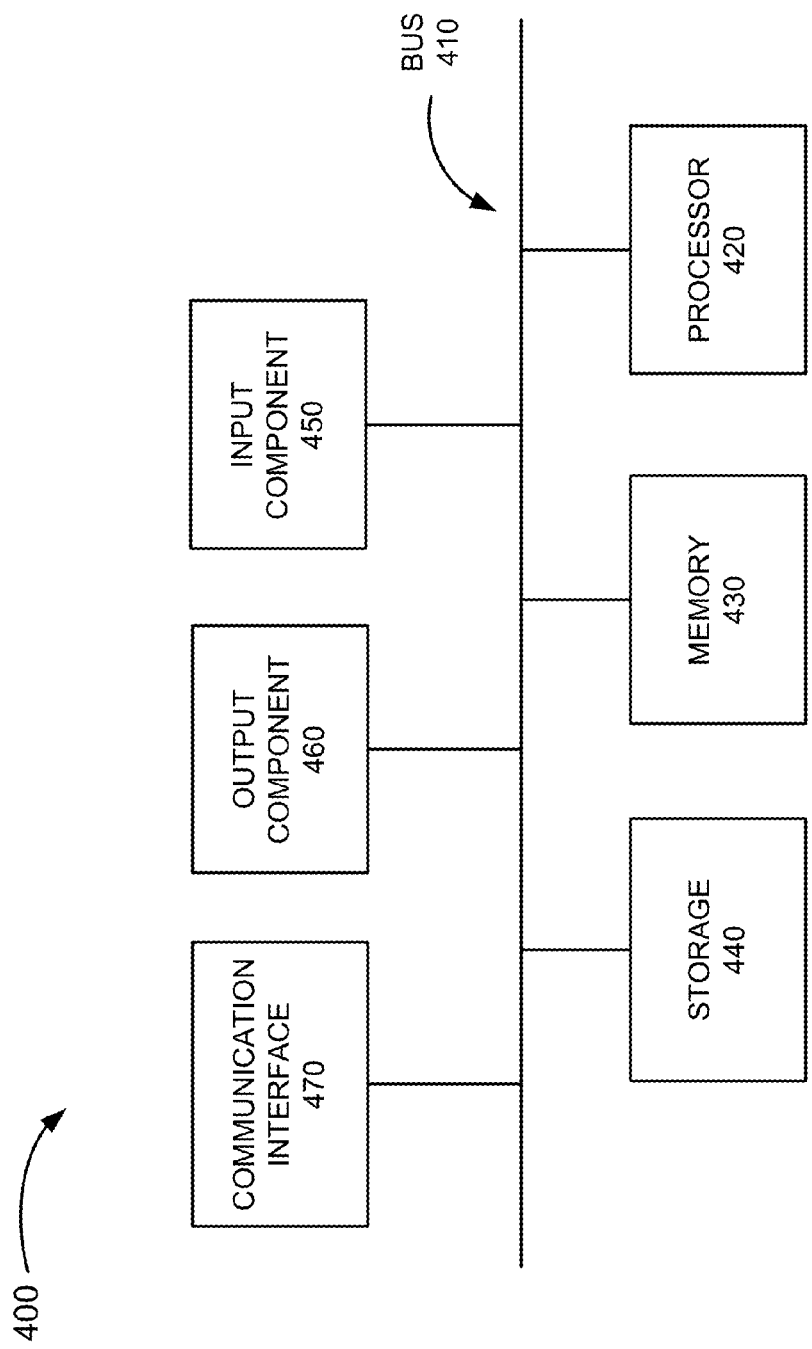
FIG. 4 is a diagram illustrating exemplary components that may correspond to one or more of the test components and/or network components depicted in FIGS. 1-3.

FIG. 4 is a diagram illustrating exemplary components of a device 400 that may correspond to one or more of the components depicted in FIGS. 1-3. For example, device 400 may correspond to one or more the test components and/or network components previously described. As illustrated, device 400 may include, among other things, a bus 410, a processor 420, a memory 430, storage 440, an input component 450, an output component 460, and/or a communication interface 470.

Bus 410 may include a path that, for example, permits communication among the components of device 400. For example, bus 410 may include a system bus, an address bus, a data bus, and/or a control bus. Bus 410 may also include bus drivers, bus arbiters, bus interfaces, and/or clocks.

Processor 420 may include a component that, for example, interprets and/or executes instructions. For example, processor 420 may include a general-purpose processor, a microprocessor, a data processor, a co-processor, a network processor, an application specific integrated circuit (ASIC), a controller, a programmable logic device, a chipset, a field programmable gate array (FPGA), or some other component that may interpret and execute instructions.

Memory 430 may include a component that, for example, stores data, an application, and/or instructions related to the operation and use of device 400. For example, memory 430 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 440 may include a component that, for example, stores data, an application and/or other types of information. For example, storage 440 may include a hard disk (e.g., a magnetic disk, an optical disk, a magneto-optic disk, etc.), a compact disc (CD), a digital versatile disc (DVD), a floppy disk, a cartridge, a magnetic tape, another type of storage medium, or another type of computer-readable medium, along with a corresponding drive. The term "computer-readable medium" is intended to be broadly interpreted to include a physical or a logical memory device. Memory 430 and/or storage 440 may also include a storing device external to and/or removable from device 400, such as a Universal Serial Bus (USB) memory stick, a hard disk, etc.

Input component 450 may include a component that, for example, permits a user and/or another component to input information to device 400. For example, input component 450 may include as a keyboard, a keypad, a mouse, a button, a switch, a microphone, voice recognition logic, etc. Output component 460 may include a component that, for example, outputs information to a user and/or another component. For example, output component 460 may include a display, a speaker, one or more light emitting diodes (LEDs), etc.

Communication interface 470 may include a component that, for example, enables device 400 to communicate with other components and/or systems. For example, communication interface 470 may include an Ethernet interface, an optical interface, a coaxial interface, a radio interface, or the like.

As will be described in detail below, device 400 may perform certain operations relating to the implementations described herein. Device 400 may perform these operations in response to processor 420 executing software instructions contained in a computer-readable medium, such as memory 430 and/or storage 440.

The software instructions may be read into memory 430 and/or storage device 440 from another computer-readable medium or from another device via communication interface 470. The software instructions contained in memory 430 and/or storage 440 may cause processor 420 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 illustrates exemplary components of device 400, in other implementations, device 400 may include fewer, additional, and/or different components than those depicted in FIG. 4. In still other implementations, one or more components of device 400 may perform one or more other tasks described as being performed by one or more other components of device 400. The connections between the components are exemplary.

Described below are examples of test environments and the test processes that may be performed by test system 105. It will be appreciated that technology specific network components and/or test components may be described; however, such particularities should not be construed as limiting the concepts described herein and/or their applications thereof.

Figure 5:
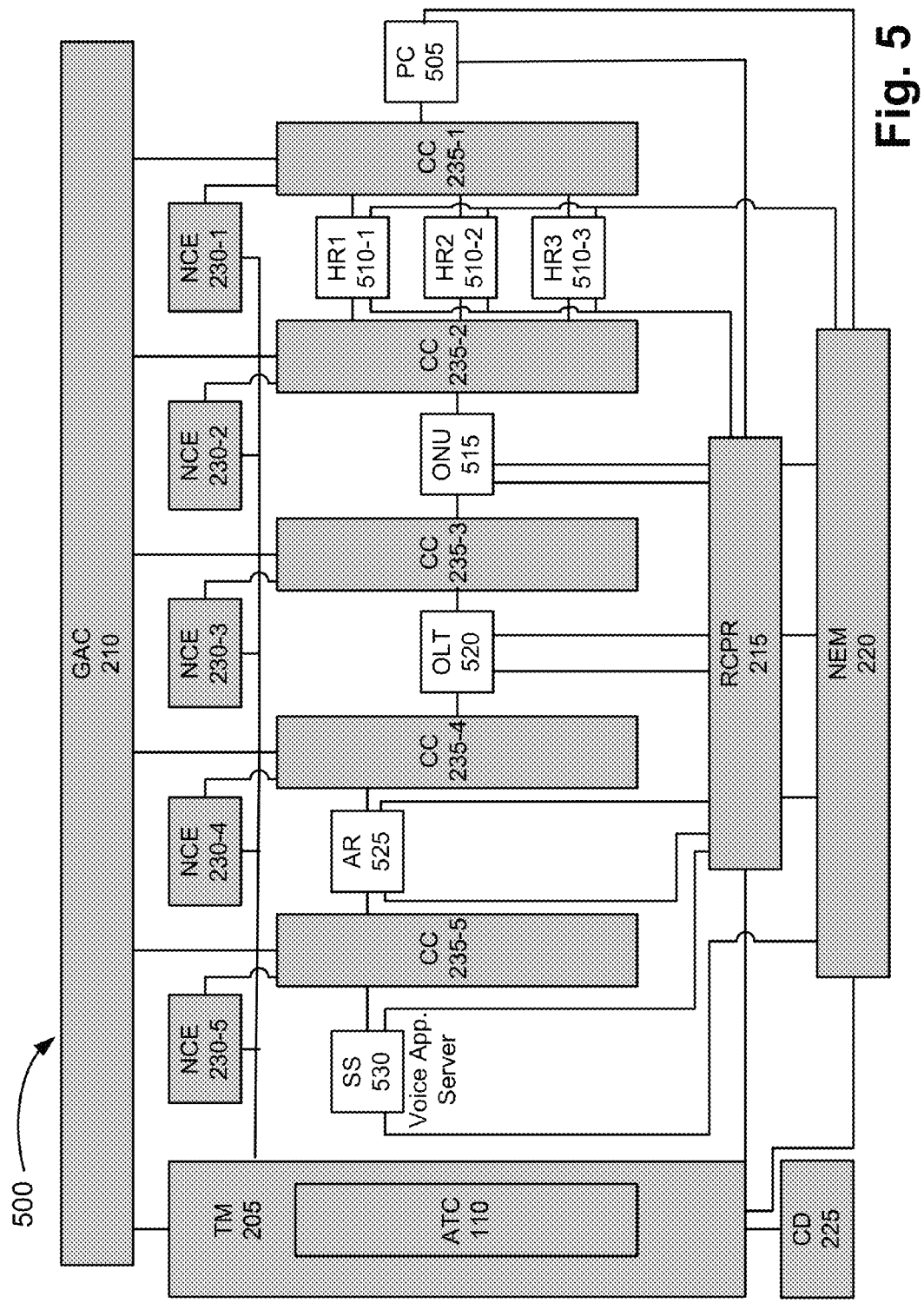
FIGS. 5-8 are diagrams illustrating exemplary test scenarios applicable to the concepts described herein.

FIG. 5 is a diagram illustrating an exemplary test environment 500. Test environment 500 may include test system 105 and test network 115. The test components of test system 105 have been shaded for purposes of illustration and description. The network components of test network 115 are not shaded. Test network 115 may include subscriber components 305. For example, test network 115 may include a PC 505 and home routers (HRs) 510 (e.g., HR1 510-1, HR2 510-2, and HR3 510-3). For example, HR1 510-1, HR2 510-2 and HR3 510-3 may correspond to different models of a HR. Test network 115 may also include operator component 315. For example, test network 115 may include an optical network unit (ONU) 515 and an optical line termination (OLT) 520. The combination of the ONU 515 and the OLT 520 may be referred to as a passive optical network (PON). ONU 515 may provide, for example, a copper-to-fiber or a fiber-to-copper service demarcation point at a customer premise for the delivery of optical services. OLT 520 may provide optical delivery of data and/or services. Test network 115 may also include service provider component 310. For example, test network 115 may include an access router (AR) 525 and a service provider server (SS) 530. SS 530 may include a voice application server. Test system 105 may be communicatively coupled within itself and test network 115 so that the test process may be conducted according to ATC 110 and/or TM 205.

In this exemplary test case, a tester may be evaluating a customer's experience with respect to service recovery time upon failure of the AR 525. The test case may be planned as a part of a root cause analysis to an issue that has been observed in the field. The issue may involve problems with SS 530 that may stem from a failure event occurring on AR 525. The test case may also investigate the interactions associated with a specific Voice over Internet Protocol (VoIP) application that runs on the subscriber's PC 505. The PON has already been excluded as a factor in the observed problem.

For this test case, PC 505 may include client software (e.g., a VoIP application). PC 505 may connect to HRs 510 that need to be tested via CC 235-1 (CC1). HRs 510 may interconnect to ONU 515 via CC 235-2 (CC2), ONU 515 may interconnect to OLT 520 via CC 235-3 (CC3), etc. Since the PON has been excluded as a factor of the problem, only a single instant of PON will be considered in the test bed.

The test may be configured to simulate a particular delay value between the PON and AR 525. NCE 230-4 (NCE4) may emulate the delay. To satisfy the loading conditions, GAC 210 may be connected to AR 525 via CC 235-4 (CC4).

Two failure scenarios may be triggered on AR 525. The first failure may include a software failure emulated using a local boot command. The second failure may include a total power failure. The total power failure may be triggered through RCPR 215.

TM 205 may generate the configuration needed to setup the test. Below is an exemplary test sequence:
Test setup to provide appropriate connectivity end-to-end.
    Create the connectivity for the CC for Test Case 1 (using HR1)
        PC is connected to HR1 via CC1 in the first test case [CONNECT (CC1, Port PC, Port HR1)]
        HR1 is connected to ONU via CC2 [CONNECT (CC2, Port HR1, Port ONU)]
        The ONU and the OLT are connected through CC3 [CONNECT (CC3, Port ONU, Port OLT)]
        The OLT is connected to NCE4, then to AR, through CC4, to introduce the required delay amount for PC traffic [CONNECT (CC4, Port OLT, Port NCE4) CONNECT (CC4, Port NCE4, Port AR)]
        AR is connected to SS through CC5 [CONNECT (CC5, Port AR, Port SS)]
        GAC is connected to AR via CC4 to emulate subscriber load condition [CONNECT (CC4, Port GAC, Port NCE4), CONNECT (CC4, Port NCE4, Port AR)]
    Save CC configuration for Test Case 1 in configuration database (CD)
    Create the connectivity for the CC for Test Case 2 (using HR2)
    Save CC configuration for Test Case 2 in the configuration database (CD)
    Create the connectivity for Test Case 3 (using HR3)
    Save CC configuration for Test Case 3 in the configuration database (CD)
    Test setup to provide appropriate configuration on network components
        Create the configuration needed for network components HR1, PON, AR and SS
        Save the network components configuration in the configuration database (CD)
    Test setup to provide appropriate configuration on the test tools
        Create the configuration needed for the GAC
        Save the test tool configuration in the configuration database (CD)
    Test setup to provide appropriate configuration for NCE4
        Create the configuration needed for NCE4
        Save the NCE configuration in the configuration database (CD)
    Test setup to provide appropriate configuration for RCPR
        Create the configuration needed for RCPR
        Save the RCPR configuration in the configuration database (CD)
TM generates the result collection procedures
    Save the result collection procedure in the configuration database (CD)
TM provides the sequence of events that are needed to implement the test
    Create the sequence file for the following:
    Upload configuration for CC for Test Case 1
    Upload configuration for network components for Test Case 1
    Upload configuration for test tools for Test Case 1
    Upload configuration for GAC for Test Case 1
    Upload configuration for NCE for Test Case 1
    Start test procedures for Test Case 1
    Collect results for Test Case 1
    Terminate Test Case 1
    Repeat for Test Case 2
    Repeat for Test Case 3
Compile test session log.

As described in FIG. 5, TM 205 may control all of the components in the test environment, allowing it to synchronize different events. Such a level of control permits test system 105 to include a variety of test components (e.g., RCPR 215, CC-235, NCE-230, etc.) to perform a variety of tests. The test components may be remotely controlled to eliminate the need for manual intervention.

Figure 6:
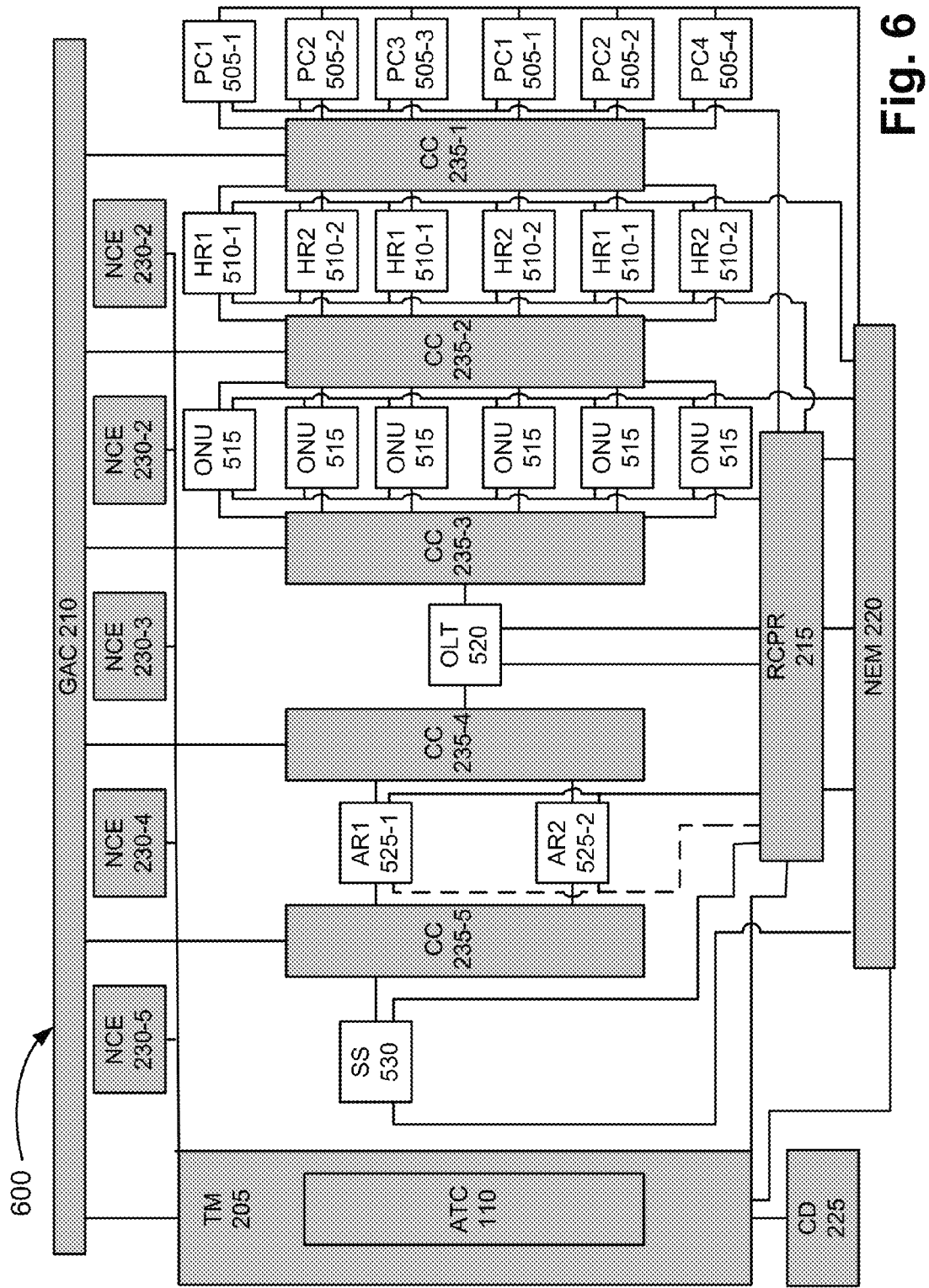
Figure 7:
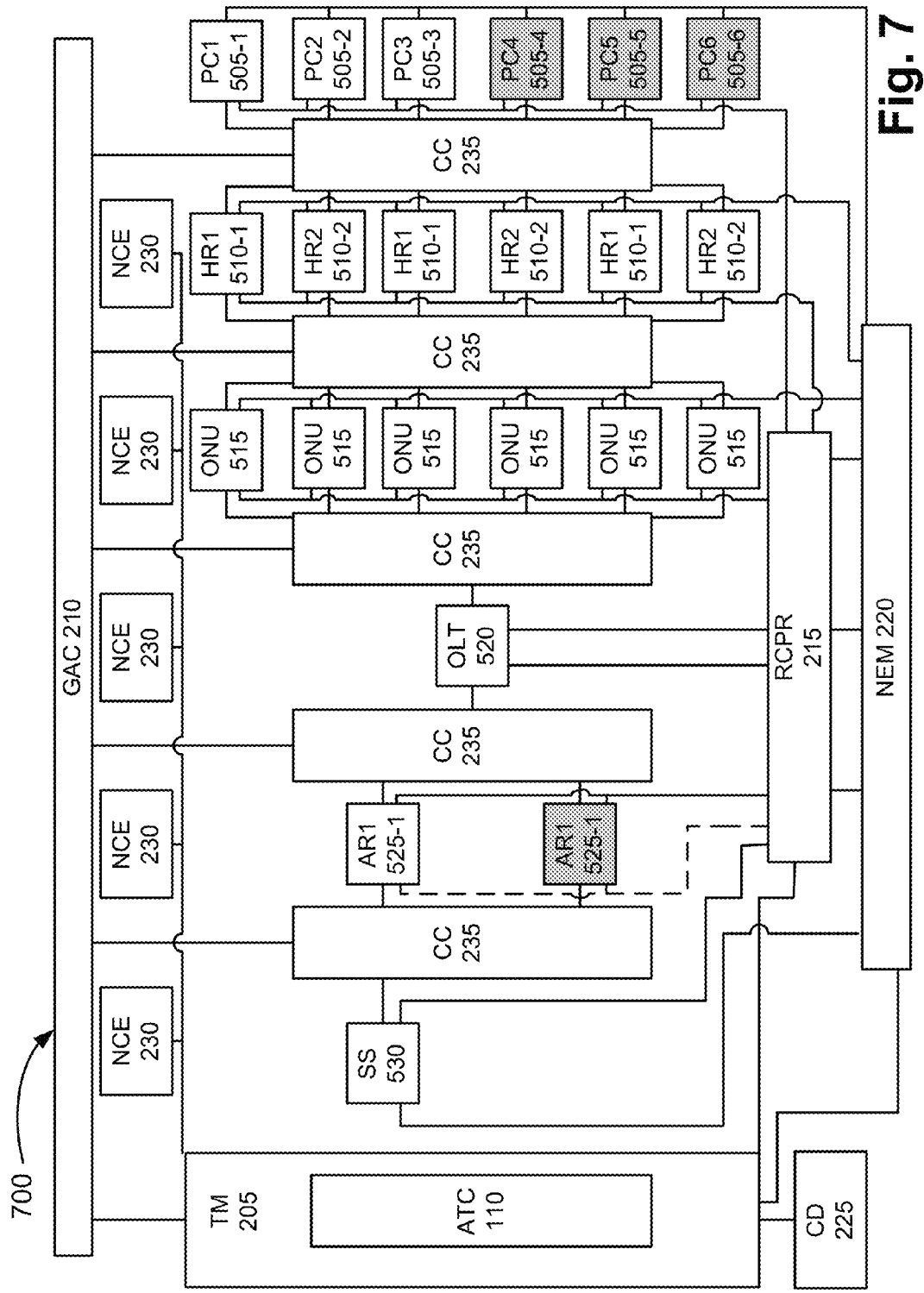
Figure 8:
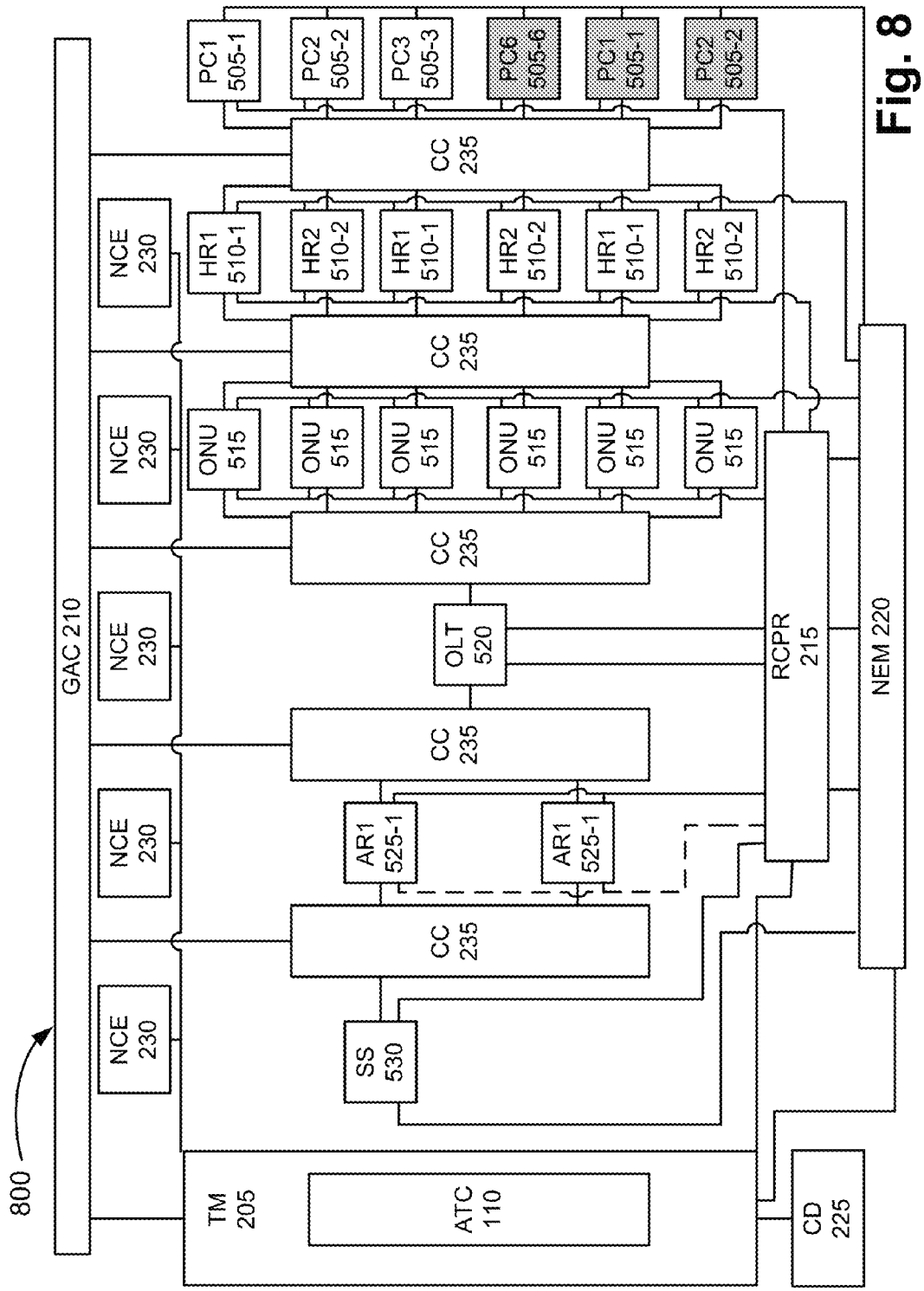

FIGS. 6-8 provide an example of test cases where test system 105 adapts the configuration of test cases based on the results of previously performed test cases. For example, ATC 110 may determine test cases that are more likely to provide additional information and/or direct the test path that will satisfy test objectives, test criteria, etc.

FIG. 6 is a diagram of an exemplary test environment 600. The network components in this example are analogous to those previously described. In this example, however, the test network supports four types of customer PCs 505 (i.e., PC1 505-1, PC2 505-2, PC3 505-3, and PC4 505-4), two models of HRs 510 (i.e., HR1 510-1 and HR2 510-2), and two software versions on the AR 525 (i.e., AR1 525-1 and AR2 525-2).

In this exemplary test case, the problem relates to packet loss. Additionally, it is assumed that prior information exists relating to this problem. For example, there is some evidence that AR 525 may be a part of the problem. There is also some evidence that PC1 505-1 and PC2 505-2 types may contribute to the problem, but no information is available to exclude the other PC types (i.e., PC3 505-3 and PC4 505-4). It has already been determined that ONU 515, OLT 520, and SS 530 do not contribute to the problem, but no information is available whether HRs 510 contribute to the problem. Further, the packet length may contribute to the amount of packet loss.

In view of the available information, test system 105 may prioritize test cases with configurations that have a probability of reproducing the problem at issue. For example, a priority list may be constructed. The priority list may list the network components that are likely to contribute to the problem (e.g., AR1 525-1, AR2 525-2, PC1 505-1, PC2 505-2). Test system 105 may also generate an exclusion list. The exclusion list may list the network components that probably do not contribute to the problem (e.g., ONU 515, OLT 520, SS 530).

Each test case may include a corresponding configuration that may include a setup of an appropriate traffic path, a generation of traffic, and a verification of whether packet loss is observed. The traffic may be generated by a software client on PCs 505. The traffic may be destined to an analyzer connected to SS 530. For example, GAC 210 may analyze the traffic via CC5 235-5.

Provided below is an exemplary sequence of events that may occur during this testing process. In this example, 6 test cases may be implemented in parallel:

Test Packet Loss (PC1, HR1, ONU, OLT, AR1, SS)
Test Packet Lost (PC2, HR2, ONU, OLT, AR1, SS)
Test Packet Loss (PC3, HR1, ONU, OLT, AR1, SS)
Test Packet Loss (PC1, HR2, ONU, OLT, AR2, SS)
Test Packet Loss (PC2, HR1, ONU, OLT, AR2, SS)
Test Packet Loss (PC4, HR2, ONU, OLT, AR2, SS)

Assume that the results associated with this phase of testing was such that the following cases were classified as "Fail," indicating packet loss:

Result [Packet Loss (PC1, HR1, ONU, OLT, AR1, SS)=Fail
Result [Packet Loss (PC2, HR2, ONU, OLT, AR1, SS)=Fail
Result [Packet Loss (PC3, HR1, ONU, OLT, AR1, SS)=Fail Based on an interpretation of the results by ATC 110, ATC 110 may determine that AR1 525-1 and not AR2 525-2 is most likely the AR associated with the problem. Additionally, ATC 110 may determine that the problem exists with respect to PC types other than PC1 505-1 and PC2 505-2. Further, ATC 110 may determine that the type of HR does not seem to affect the test results. ATC 110 may consider such information in selecting the configuration for the next round of test cases. For example, the priority list may be updated. The priority list may include AR1 525-1 and PCx—where x may be an integer from 1 to 6 corresponding to PCs 505 (i.e., PCs 1 through 6). The software on AR2 525-2 may be changed to AR1, which may allow additional test cases to be performed with a focus on AR1 525-1. TM 205 may manage the software version change on the AR. The exclusion list may also be updated. For example, the exclusion list may include ONU 515, OLT 520, SS 530, and AR2 525-2.

Based on the observations of the previous test cases, test network 115 may be modified. FIG. 7 is a diagram illustrating the exemplary test environment that reflects these changes. For example, PC1 505-1 has been changed to PC4 505-4, PC2 505-2 has been changed to PC5 505-2, PC4 505-4 has been changed to PC6 505-6, and AR2 525-2 has been changed to AR1 525-1. For purposes of illustration, these changes are reflected by shading in FIG. 7.

Additionally, based on determinations made by ATC 110, the following test cases may be subsequently implemented in parallel:

Test Packet Loss (PC1, HR1, ONU, OLT, AR1, SS)
Test Packet Loss (PC2, HR2, ONU, OLT, AR1, SS)
Test Packet Loss (PC3, HR1, ONU, OLT, AR1, SS)
Test Packet Loss (PC4, HR2, ONU, OLT, AR1, SS)
Test Packet Loss (PC5, HR1, ONU, OLT, AR1, SS)
Test Packet Loss (PC6, HR2, ONU, OLT, AR1, SS)

Assume that the results associated with this phase of the testing process yields the following packet loss failures:

Result [Packet Loss (PC1, HR1, ONU, OLT, AR1, SS)=Fail
Result [Packet Loss (PC2, HR2, ONU, OLT, AR1, SS)=Fail
Result [Packet Loss (PC3, HR1, ONU, OLT, AR1, SS)=Fail
Result [Packet Loss (PC6, HR2, ONU, OLT, AR1, SS)=Fail Based on an interpretation of the results by ATC 110, ATC 110 may determine that the problem is limited to PC1 505-1, PC2 505-2, PC3 505-3 and PC6 505-6 when used with AR1 525-1. Additionally, ATC 110 may determine that the type of HR does not seem to affect the test result.

At this stage of the testing process, in one implementation, ATC 110 may determine that the network components contributing to the problem have been identified. In such an instance, ATC 110 may extend the scope of the test cases to aspects not covered in the earlier test cases. For example, test system 105 may investigate the effect of packet size on the amount of observed packet loss.

ATC 110 may consider such information in selecting the configuration for the next round of test cases. For example, the priority list may be updated. The priority list may include (AR1 525-1, PC1 505-1, PC2 505-2, PC3 505-3, PC6 505-6, packet length). The exclusion list may also be updated. For example, the exclusion list may include ONU 515, OLT 520, SS 530, AR2 505-2, HR1 510-1, HR2 510-2, PC4 505-4, and PC5 505-5.

Based on the observations of the previous test cases, the test network may be modified. FIG. 8 is a diagram illustrating the exemplary test environment 800 that reflects these changes. For example, PC4 505-4 has been changed to PC6 505-6, PC5 505-5 has been changed to PC1 505-1, and PC6 505-6 has been changed to PC2 505-2. For purposes of illustration, these changes are reflected by shading in FIG. 8.

To reduce the amount of time needed for the test, different packet size ranges may be considered for each test case, thus allowing appropriate coverage. Based on such determinations by ATC 110, the following test cases may be subsequently implemented in parallel:

Test Packet Loss (PC1, HR1, ONU, OLT, AR1, SS, packet size range L1)
Test Packet Loss (PC2, HR2, ONU, OLT, AR1, SS, packet size range L2)
Test Packet Loss (PC3, HR1, ONU, OLT, AR1, SS, packet size range L3)
Test Packet Loss (PC6, HR2, ONU, OLT, AR1, SS, packet size range L4)
Test Packet Loss (PC1, HR1, ONU, OLT, AR1, SS, packet size range L5)
Test Packet Loss (PC2, HR2, ONU, OLT, AR1, SS, packet size range L6)

Assume that the pass classification criterion for each packet loss case is that the loss percentage does not exceed 1%. The results associated with this phase of the testing process yields the following packet loss failures:

Result [Packet Loss (PC6, HR2, ONU, OLT, AR1, SS, packet size range L4)=Fail
Result [Packet Loss (PC6, HR2, ONU, OLT, AR1, SS, packet size range L5)=Fail At this stage of the test process, test system 105 may conclude the following results:

Packet loss is limited to the case when AR1 is used with PC1, PC2, PC3, and PC6
Packet loss exceeds threshold for packet size ranges L4 and L5
HR is not a contributing factor in the packet loss problem FIGS. 6-8 provide illustration of operations performed by ATC 110 and testing system 105. It will be appreciated that testing system 105 may perform different, additional, or fewer operations depending on the objective of the test, the test components and the network components utilized during the test, the results generated during the test process, etc.

Figure 9:
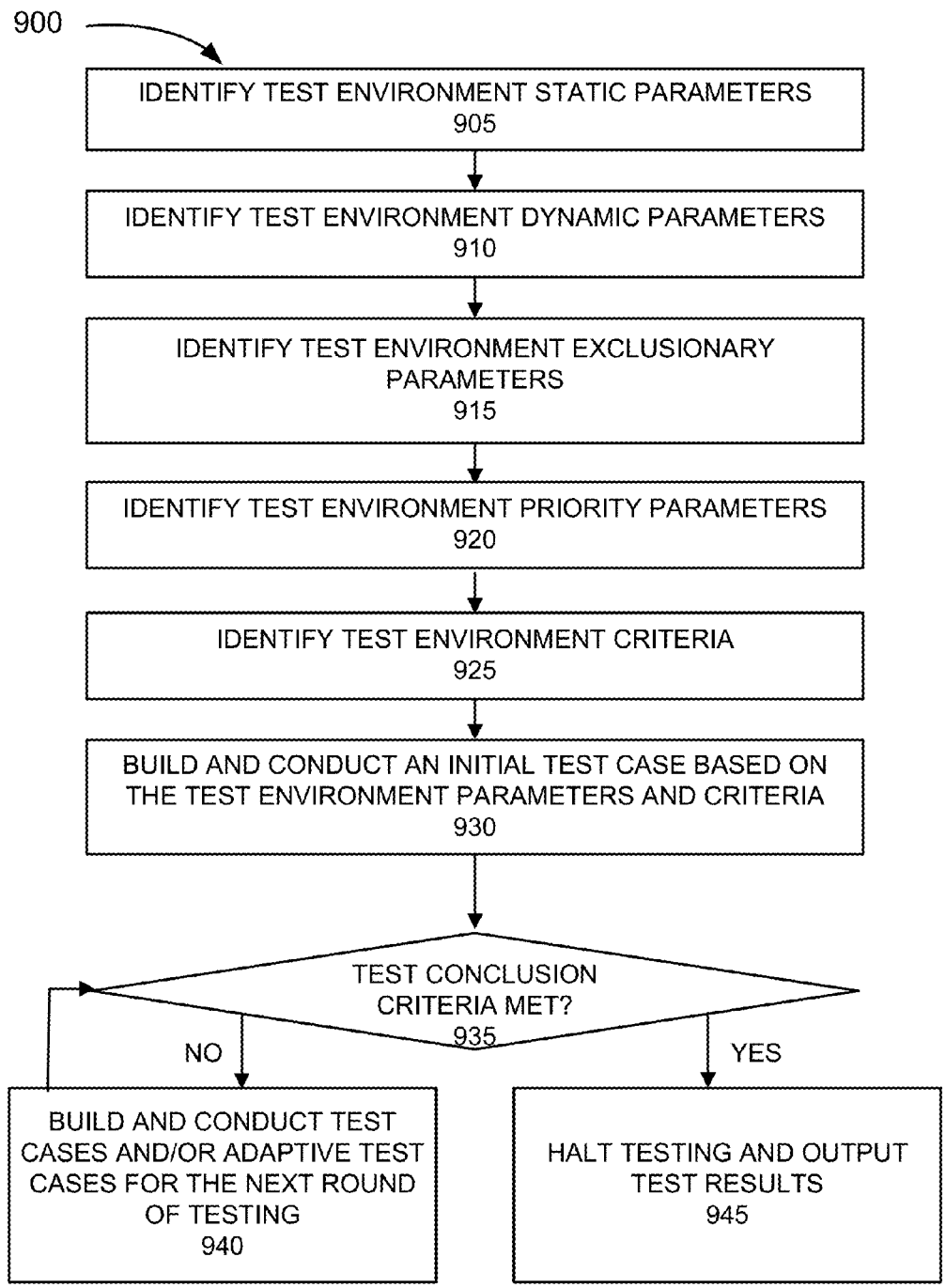
FIG. 9 is a flow diagram illustrating an exemplary process associated with the concepts described herein.

FIG. 9 is a flow diagram illustrating an exemplary process 900 that may be associated with the concepts described herein. In addition to FIG. 9, process 900 may be described in reference to the previously described figures. Process 900 may be performed by one or more of the test components of test system 105.

Process 900 may begin with identifying test environment static parameters (block 905). CD 225 may receive information related to static parameters associated with a test case. For example, a tester may identify parameters that are static and store them in CD 225. A static parameter may include, for example, a parameter that may not change during the testing process. Depending on the test case, the static parameter may correspond to, for example, a network component, a traffic pattern, a type of service, etc.

Test environment dynamic parameters may be identified (block 910). CD 225 may receive information related to dynamic parameters associated with a test case. For example, a tester may identify parameters that are dynamic and store them in CD 225. A dynamic parameter may include, for example, a parameter that may change during the testing process. Depending on the test case, the dynamic parameter may correspond to, for example, a performance metric (e.g., delay), a packet length, etc.

Test environment exclusionary parameters may be identified (block 915). CD 225 may receive information related to exclusionary parameters associated with a test case. For example, a tester may identify parameters that are considered exclusionary and store them in CD 225. An exclusionary parameter may include, for example, a parameter that may not contribute toward a particular problem that is being tested. For example, the exclusionary parameter may relate to a network component of a test network. Additionally, or alternatively, the exclusionary parameter may relate to other types of conditions that may be associated with the configuration of the test case and/or processes that may occur when the test case is conducted.

Test environment priority parameters may be identified (block 920). CD 225 may receive information related to priority parameters associated with a test case. For example, a tester may identify parameters that may be considered a priority and store them in CD 225. A priority parameter may include, for example, a parameter that may contribute toward a particular problem that is being tested. For example, the priority parameter may relate to a network component of a test network. Additionally, or alternatively, the priority parameter may relate to other types of conditions that may be associated with the configuration of the test case and/or processes that may occur when the test case is conducted.

Test environment criteria may be identified (block 925). CD 225 may receive information related to one or more criterion associated with a test objective. For example, a tester may identify threshold values relating to a performance metric (e.g., a packet loss percentage) or a quality control metric. The test environment criteria may provide information to permit TM 205/ATC 110 to determine whether further test cases need to be conducted.

An initial test case may be built and conducted based on the test environment parameters and criteria (block 930). TM 205/ATC 110 may reference CD 225 to schedule, setup and conduct the initial test case based on the test environment parameters and criteria, as previously described. TM 205/ATC 110 may remotely control various test components and/or network components of the test environment. The results of the test may be stored in CD 225.

It may be determined whether the test criteria have been met (block 935). TM 205/ATC 110 may evaluate test results associated with the initial test case based on the test environment criteria. TM 205/ATC 110 may determine whether further test cases need to be built and conducted based on its evaluation, as previously described. If it is determined that the test criteria have not been met (block 935—NO), then test cases and/or adaptive test cases for a next round of testing may be built and conducted (block 940). For example, TM 205/ATC 110 may adapt the next round of testing based on the test results of the initial test case. TM 205/ATC 110 may update test environment test parameters (e.g., priority, exclusionary, etc.) as well other types of configuration data so as to direct the next round of test cases toward satisfying the test objective (e.g., test environment criteria), as previously described. In the event that test cases that are not adaptive are built and conducted, these test cases may be based on initial configuration parameters.

Alternatively, if it is determined that the test criteria have been met (block 935—YES), then testing may be halted and the test results may be output (block 945). For example, TM 205/ATC 110 may halt further testing. TM 205/ATC 110 may compile the test results and store them in CD 225 and/or output them in some other form (e.g., output to a visual display, print to printer, etc.). A tester may access the output test results.

Although FIG. 9 illustrates an exemplary process 900, in other implementations, fewer, additional, or different processes may be performed. For example, test results may output for each round of testing. Additionally, or alternatively, a tester may input further data in CD 225 to facilitate attaining the test objective based on the output of the test results.

According to the concepts described herein, test system 105 may perform various testing processes in a different manner than existing test systems. For example, there are situations where the exact test procedures and parameters are not fully identified prior to the testing. In such instances, for example, test system 105 may adapt the testing process (e.g., parameters, configuration data, test environment) based on information stemming from earlier testing processes and/or other available information (e.g., provided by a tester). As described herein, test system 105 may adapt the order, the scope, and/or the number of subsequent test cases that lead towards the areas and the parameters that most efficiently correlate with a test objective and/or test criteria. For example, test system 105 may reduce the number of test cases by selecting test cases that are more likely to yield additional information and/or steer the test path away from test cases that may not provide significant additional information. Test system 105 may also reduce the amount of time to conduct the test, as well as other factors that naturally flow therefrom.

The foregoing description of implementations provides illustration, but is not intended to be exhaustive or to limit the implementations to the precise form disclosed. In this regard, the concepts described herein may have broad application. For example, the test system described herein may be implemented with respect to various types of testing (e.g., developmental, quality control, trouble shooting, etc.). The test system provides for automatic and adaptive operations that may facilitate testing procedures in a variety of test environments. Additionally, a variety of testing components may be incorporated into the test system to provide a tester with an expansive platform for testing a variety of test networks, a broader scope of problems, etc. For example, a centralized test component may allow the tester to coordinate and synchronize various test components and events needed during a test process. In addition, the centralized test component may be utilized various testing procedures in an adaptive manner.

The term "may" is used throughout this application and is intended to be interpreted, for example, as "having the potential to," "configured to," or "being able to", and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while a series of blocks has been described with regard to the process illustrated in FIG. 9, the order of the blocks may be modified in other implementations. Further, non-dependent blocks may be performed in parallel.

It will be apparent that the device(s) described herein may be implemented in many different forms of software, firmware, and hardware in the implementations illustrated in the figures. The actual software code or specialized control hardware used to implement these concepts does not limit the invention. Thus, the operation and behavior of a device(s) was described without reference to the specific software code—it being understood that software and control hardware can be designed to implement the concepts based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:
    receiving, by a test system, a test objective that includes a problem to be solved;
    receiving, by the test system, a first set of test parameters for a first test case of network components in a test network to be tested in a test environment, wherein the first set of test parameters include one or more static parameters that do not change during a testing of the first test case, one or more dynamic parameters that change during the testing of the first test case, one or more exclusionary parameters that identify one or more parameters known not to contribute to the problem to be solved, and one or more priority parameters that have a probability to contribute to the problem to be solved;
    conducting, by the test system, the first test case based on the first set of test parameters;
    analyzing, by the test system, a result of the first test case;
    determining, by the test system, whether the test objective is satisfied based on the analyzing of the result of the first test case; and
    adapting, by the test system, a second test case, in response to determining that the test objective is not satisfied, wherein the adapting includes:
        identifying a measure of probability that the second test case will identify a source of the problem to be solved with a greater probability than another test case; and
        generating a second set of test parameters that include one or more static parameters, one or more dynamic parameters, one or more exclusionary parameters, and one or more priority parameters; and
    automatically reconfiguring, by the test system, one or more interconnections among the network components in the test network based on the second set of test parameters, wherein the one or more interconnections are different from one or more interconnections used during the first test case.

2. The method of claim 1, further comprising:
    generating a priority list that lists one or more of the network components in the test network likely to contribute to the source of the problem; and
    generating an exclusionary list that lists one or more of the network components in the test network likely to not contribute to the source of the problem.

3. The method of claim 2, further comprising:
    updating the priority list based on the result of the first test case;
    updating the exclusionary list based on the result of the first test case; and
    conducting the second test case based on an updated priority list and an updated exclusionary list.

4. The method of claim 1, wherein the adapting includes one or more of modifying an order of test cases, modifying a scope of test cases, modifying a number of test cases, or modifying a scope of the test objective.

5. The method of claim 1, wherein the first set of test parameters include one or more priority parameters specifying a type of network traffic to be generated during testing of the first test case.

6. The method of claim 1, wherein the first set of test parameters include power parameters to regulate power supplied to the network components during the first test case, in which the power parameters indicate to supply power to one or more of the network components and to deprive power to one or more other network components of the network components.

7. The method of claim 1, wherein the analyzing comprises:
    identifying one or more network components in the test network that contribute to the problem to be solved based on the analyzing; and
    identifying one or more network components in the test network do not contribute to the problem to be solved based on the analyzing, and wherein the test objective includes a threshold value relating to a performance metric of the test network or a quality control metric associated with one or more of the network components.

8. The method of claim 1, wherein the conducting comprises:
    reproducing one or more network conditions in the test network based on the first set of parameters, wherein the one or more network conditions represents the problem to be solved.

9. A test system comprising:
    a test component comprising:
        a communication interface;
        a memory, wherein the memory stores instructions; and
        a processor, wherein the processor executes the instructions to:
            receive a test objective that includes a problem to be solved;
            receive a first set of test parameters for a first test case of network components in a test network to be tested in a test environment, wherein the first set of test parameters include one or more static parameters that do not change during a testing of the first test case, one or more dynamic parameters that change during the testing of the first test case, one or more exclusionary parameters that identify one or more parameters known not to contribute to the problem to be solved, and one or more priority parameters that have a probability to contribute to the problem to be solved;

manage, via the communication interface, other test components of the testing system, based on the first set of test parameters, when the first test case is conducted;

analyze a result of the first test case;

determine whether the test objective is satisfied based on an analysis of the result of the first test case; and adapt a second test case, in response to a determination that the test objective is not satisfied, wherein to adapt the second test case includes to:

identify a measure of probability that the second test case will identify a source of the problem to be solved with a greater probability than another test case; and generate a second set of test parameters that include one or more static parameters, one or more dynamic parameters, one or more exclusionary parameters, and one or more priority parameters; and automatically reconfigure one or more interconnections among the network components in the test network based on the second set of test parameters, wherein the one or more interconnections are different from one or more interconnections used during the first test case.

10. The test system of claim 9, wherein the test objective includes a threshold value relating to a performance metric of the test network or a quality control metric associated with one or more of the network components.

11. The test system of claim 9, wherein the processor of the test component further executes instructions to:
determine that a first factor associated with the problem to be solved has been satisfactorily tested; and
identify a second factor associated with the problem to be solved in the second test case.

12. The test system of claim 9, wherein, when adapting the second test case, the processor of the test component further executes instructions to:
modify at least one of an order of test cases, a number of test cases, or a scope of a test objective.

13. The test system of claim 9, wherein, when adapting the second test case, the processor of the test component further executes instructions to:
generate a priority list that lists one or more of the network components in the test network likely to contribute to the source of the problem; and
generate an exclusionary list that lists one or more of the network components in the test network likely to not contribute to the source of the problem.

14. The test system of claim 9, wherein the problem to be solved pertains to a network condition in the test network, and the first test case simulates the network condition.

15. The test system of claim 9, wherein the first set of test parameters include power parameters to regulate power supplied to the network components during the first test case, in which the power parameters indicate to supply power to one or more of the network components and to deprive power to one or more other network components of the network components.

16. The test system of claim 9, wherein the first set of test parameters include one or more parameters specifying a type of network traffic to be generated during the testing of the first test case.

17. A non-transitory storage medium that stores instructions executable by a computational device, the instructions comprising instructions to:
receive a test objective that includes a problem to be solved;
receive a first set of test parameters for a first test case of network components in a test network to be tested in a test environment, wherein the first set of test parameters include one or more static parameters that do not change during a testing of the first test case, one or more dynamic parameters that change during the testing of the first test case, one or more exclusionary parameters that identify one or more parameters known not to contribute to the problem to be solved, and one or more priority parameters that have a probability to contribute to the problem to be solved;
conduct the first test case based on the first set of test parameters;
analyze a result of the first test case;
determine whether the test objective is satisfied based on an analysis of the result of the first test case;
adapt a second test case, in response to a determination that the test objective is not satisfied, wherein to adapt the second test case includes to:
identify a measure of probability that the second test case will identify a source of the problem to be solved with a greater probability than another test case; and
generate a second set of test parameters that include one or more static parameters, one or more dynamic parameters, one or more exclusionary parameters, and one or more priority parameters; and
automatically reconfigure one or more interconnections among the network components in the test network based on the second set of test parameters, wherein the one or more interconnections are different from one or more interconnections used during the first test case.

18. The non-transitory storage medium of claim 17, the instructions comprising further instructions to:
generate a priority list that lists one or more of the network components in the test network likely to contribute to the source of the problem; and
generate an exclusionary list that lists one or more of the network components in the test network likely to not contribute to the source of the problem.

19. The non-transitory storage medium of claim 18, the instructions comprising further instructions to:
update the priority list based on the result of the first test case;
update the exclusionary list based on the result of the first test case; and
conduct the second test case based on an updated priority list and an updated exclusionary list.

20. The non-transitory storage medium of claim 17, the instructions comprising further instructions to:
identify one or more of the network components in the test network that contribute to the problem to be solved based on the analysis of the result of the first test case; and identify one or more of the network components in the test network that do not contribute to the problem to be solved based on the analysis of the result of the first test case.

* * * * *